Figure 1:
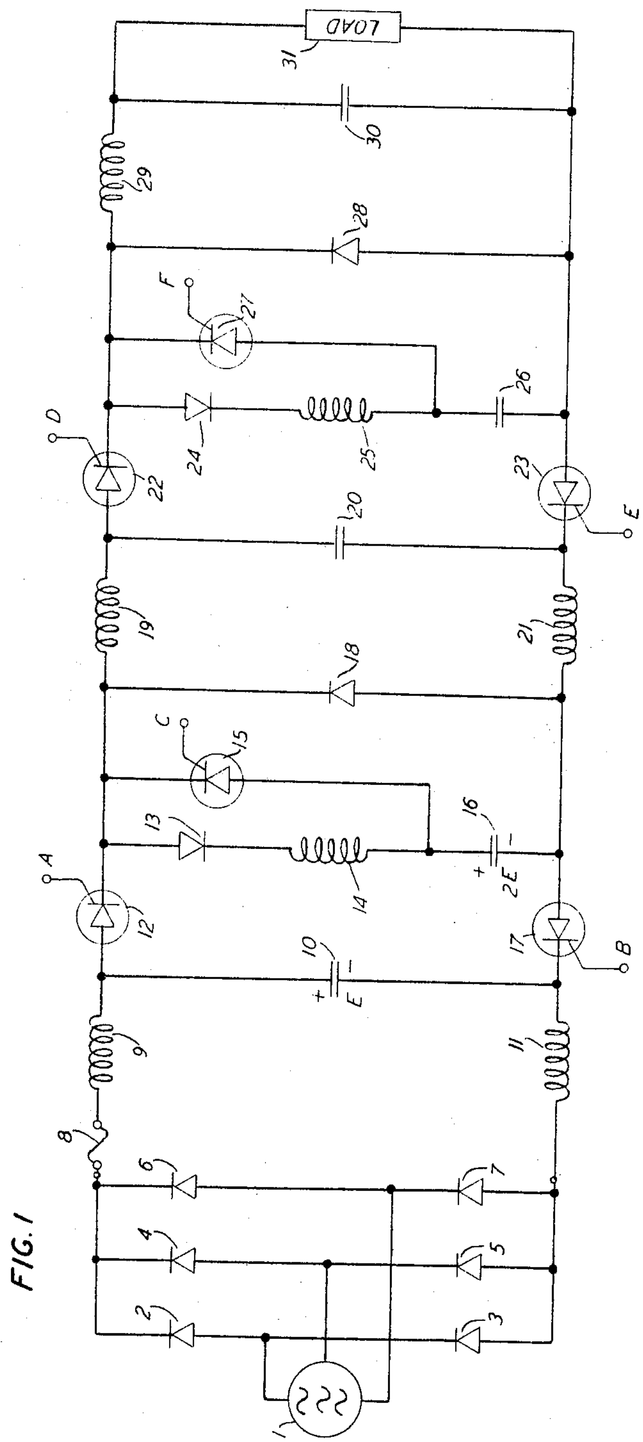

TRANSFORMER REPLACEMENT SYSTEM

Filed Dec. 19, 1962

INVENTOR
P. W. CLARKE
BY R. B. Ardis
ATTORNEY

TRANSFORMER REPLACEMENT SYSTEM

Filed Dec. 19, 1962

United States Patent Office 3,273,044
Patented Sept. 13, 1966

3,273,044
TRANSFORMER REPLACEMENT SYSTEM

Patrick W. Clarke, Murray Hill, N.J., assignor to Bell Telephone Laboratories, Incorporated, New York, N.Y., a corporation of New York Filed Dec. 19, 1962, Ser. No. 245,817
4 Claims. (Cl. 321—18)

This invention relates to solid state transformer replacement systems and more particularly to transformer replacement systems wherein the isolation and regulation functions are combined.

In recent years, the power supply art has felt an ever increasing need for higher capacity rectifiers in the 10 to 100 kilowatt range. Simultaneously, space, heat, reliability, cost, and efficiency requirements are being increasingly emphasized to the paradoxical extreme of limiting the range of the rectifier. The reasons for the paradox are apparent when the comparatively titanic size of the low frequency isolation transformers and associated filter inductors required to deliver power in the noted range are considered. Many times special oversized transformer construction facilities have been built in an attempt to fill the ever increasing need for the isolation transformers and associated filters that are synonymous with each power rectifier. Such new construction facilities or, minimally, expansion of the old facilities, drives the rectifier per unit cost to an unattractive figure which, however, at the present state of the art must be borne as the price of increased power. In passing it should also be noted that although transformer maintenance costs are relatively low, the cost of the space occupied by the transformer and the associated filtering units more than over-shadows any maintenance savings.

Transformers are necessary in high power-capacity rectifiers to provide isolation between the commercial power input supply (usually open-wire or cable power transmission lines from a generating station located many miles away) and the output circuit and vice versa. The isolation introduced by the transformers protects the rectifiers and associated circuitry from transient surges such as those caused by lightning and intercircuit induction. The inductance of the isolation transformer, however, results in power factor disadvantages (i.e., the kva. rating of the generator has to be much larger than the kw., or usable power, rating) which often prompts the commercial supplier to require the consumer to provide compensating networks. The compensating networks, because of the low frequencies and high power involved, are also of a relatively large size.

The prior art results of attempts to "design-around" the isolation transformer have proved to be complex, costly, unreliable and have consumed proportionately large amounts of space. Because of the relatively low frequencies involved, e.g., the ripple frequency of 60 cycles per second, large space-consuming filter inductors and electrolytic capacitors have been required. Additionally, since voltage regulation is often desired, the complexity introduced by this additional circuitry in both the transformer and transformerless circuits increases the related space, cost and reliability disadvantages.

It should be recognized at this point that although to the unindoctrinated the problem of electrical isolation may seem insignificant, this problem is one that has long plagued practically all phases of the electronic industry. The problem has become ever increasingly bothersome since the advent of solid state circuitry and the associated emphasis on miniaturization.

As noted heretofore, it is indeed paradoxical that while the power capabilities of solid state components have become increasingly larger and the associated circuitry less and less complex, the transformer has inversely become larger and larger (due to increased power demands) to the point that transformer proportions are many times greater than those of all the remaining combined circuitry. Although this very obvious and bothersome problem has existed for a relatively long period of time, no satisfactory scheme, solid state or otherwise, has been found to eliminate the isolation transformer.

It is, therefore, an object of this invention to eliminate transformers and associated large filter and compensating components in rectifier circuits.

It is another object of this invention to incorporate simple, inexpensive, high-speed switching regulating circuitry in a transformerless solid state rectifier.

Still another object of the invention is to do so as simply, inexpensively, reliably, and efficiently as possible.

As discussed in detail hereinafter, the present invention employs circuit interrupting means, such as controlled rectifiers, which are switched at a relatively high frequency rate to simulate transformer isolation characteristics, i.e., the load is isolated from the line and the line from the load at all times. Isolation is achieved by switching the interrupters on an alternate basis so that when one is conducting the other is not and vice-versa. Energy is thus transmitted and filtered between an intermediate storage network to supply the load. Control circuit interrupters, such as controlled rectifiers, are employed for the dual functions of "turning off" the transformer simulation interrupters and regulating the load voltage in accordance with load voltage variations. Switching the interrupters at a relatively high frequency eliminates the prior art need for "over-sized" filter components. Additionally, since a transformer with its associated inductance is no longer required, power factor compensating networks may be eliminated. (The power factor of circuits embodying the present invention is substantially unity.) The over-all space and cost savings of the present invention represent large, significant monetary savings over the transformer circuits of the prior art.

Other objects and features of the present invention will become apparent upon consideration of the following detailed description when taken in connection with the accompanying drawings:

FIG. 1 of which illustrates a simple embodiment of the present invention, while

Figure 2:
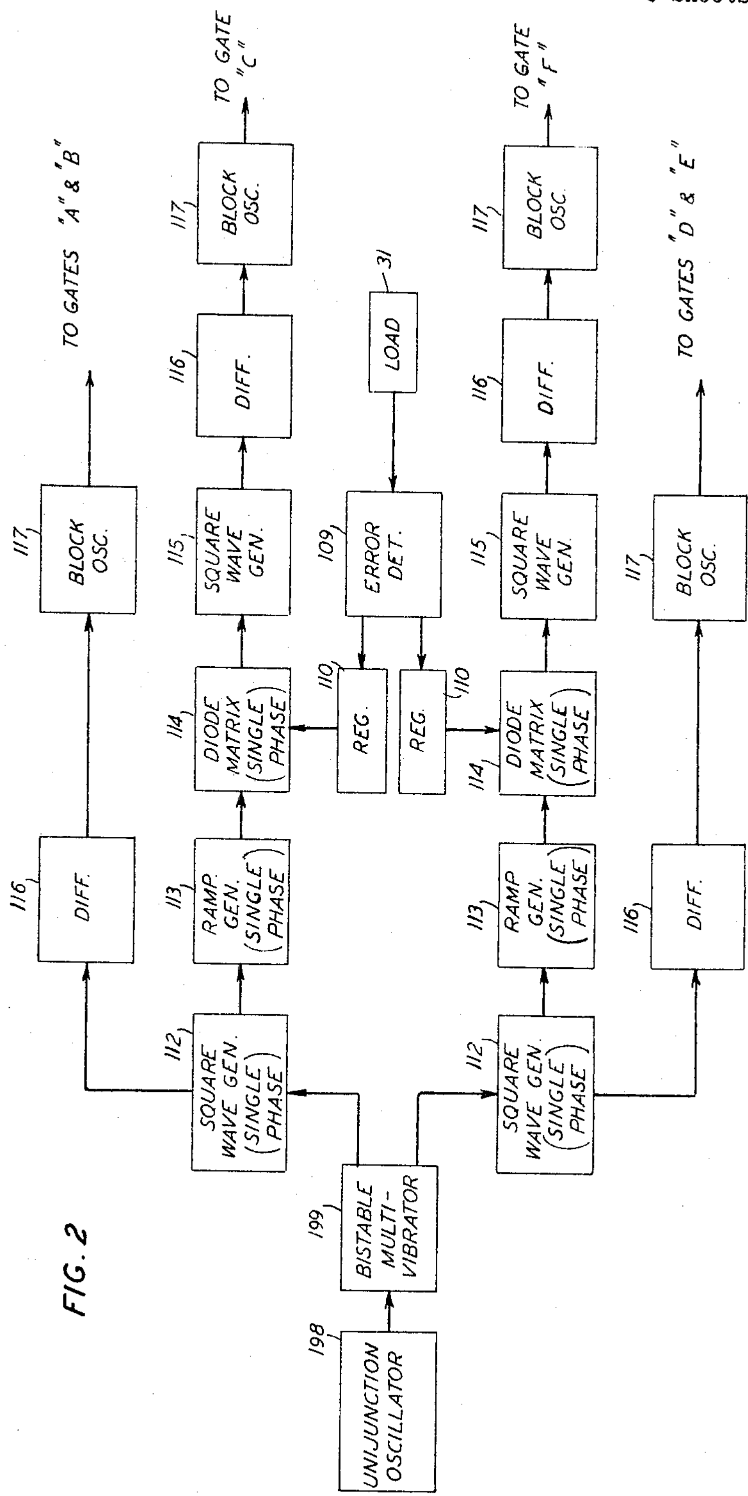

FIG. 2 illustrates the control circuitry associated with the embodiment of FIG. 1.

As can be seen from FIG. 1 of the drawings there is provided a source of three-phase alternating current energy 1, a three-phase rectifying network comprising diodes 2 through 7, a fuse 8, an input filter comprising inductors 9 and 11 and capacitor 10, a first "chopping" or isolation stage comprising controlled rectifiers 12 and 17 and regulating controlled rectifier 15 which also serves as a "turn-off" network in combination with diode 13, inductor 14 and capacitor 16, energy storage means comprising inductors 19 and 21, capacitor 20 and fly-back diode 18, a second "chopping" or isolation stage comprising controlled rectifiers 22 and 23 and regulating controlled rectifier 27 which also serves as a "turn-off" network for controlled rectifiers 22 and 23 in combination with diode 24, inductor 25, and capacitor 26, a final energy storage and filtering stage comprising inductor 29, capacitor 30, and fly-back diode 28, and a load 31.

The control circuitry of the invention is shown in FIG. 2. A conventional unijunction oscillator 198 is employed to determine the frequency of the firing pulses supplied to the controlled rectifiers. The output of the oscillator 198 is fed into a conventional bistable multivibrator 199. The unijunction oscillator 198, multivibrator 199 combination may be any such conventional configuration as, for example, the one shown in Fig. 4.17, section 4.14.3, page 53 of the General Electric Silicon Controlled Rectifier Manual, 2d edition (1961). The remaining boxes and the reference numerals associated therewith refer to control circuitry disclosed in the copending application of P. W. Clarke and J. A. Pirraglia, Ser. No. 206,571, filed July 2, 1962, and assigned to the same assignee as the present application. Since the operation of the control circuitry is discussed at length in that application, it appears to be sufficient to note at this point that the control circuitry employed in the present invention is the single phase control circuitry discussed in the noted application rather than the multiphase which is also discussed. For present purposes it is necessary only to note that the same relatively short duration firing pulses is delivered to both controlled rectifiers 12 and 17 (i.e., to gate leads A and B, respectively) and that they are fired at alternate intervals on an equal duty cycle basis with controlled rectifiers 22 and 23 (which are also "fired" by the same short duration firing pulse to gate leads D and E, respectively). Hence, while controlled rectifiers 12 and 17 are simultaneously conducting, controlled rectifiers 22 and 23 are nonconducting and vice versa as discussed in detail hereinafter. Regulation is achieved by controlling the point at which controlled rectifiers 12 and 17 or 22 and 23 are "turned-off" by controlled rectifiers 15 and 27, respectively. The firing of these latter controlled rectifiers (15 and 27 by applying an individual short duration firing pulse to gate leads C and F) is under control of the load voltage, i.e., the time at which the firing pulse is applied is advanced for an increase in load voltage and retarded for a decrease in load voltage thus, either decreasing or increasing the load voltage, respectively, in response to the load voltage variations as also discussed in detail hereinafter. As should be apparent from the control circuitry of FIG. 2, the first pair of controlled rectifiers 12 and 17 and the second pair of controlled rectifiers 22 and 23 are fired 180 degrees out of phase in time and at a fixed frequency (of the oscillator 198) with respect to each other. The portion of the half cycle of oscillator 198 that each of these pairs of controlled rectifiers conduct, however, is determined by controlled rectifiers 15 and 27 to achieve voltage regulation. It is, therefore, possible that at any given instant in time each of controlled rectifiers 12, 17, 22, and 23 will be nonconductive. It is not possible for controlled rectifiers 22 and 23 to be conductive when controlled rectifiers 12 and 17 are conductive and vice versa. The frequency at which the controlled rectifiers are fired is many times greater than the frequency of the A.C. input source 1. The exact operation of the controlled circuitry is discussed in the copending application noted and is, therefore, not discussed further at this time.

The operation of the circuit of FIG. 1 is as follows: Each phase of the three-phase commercial input supply 1 is fed to a separate arm of the conventional full wave rectifier diode matrix comprising diodes 2, 3, 4, 5, 6, and 7. The output of the diode matrix is protected by a fuse 8 and fed into an energy storage network comprising inductors 9 and 11 and capacitor 10. Inductors 9 and 11 are "split," as opposed to the conventional "lumped" inductor, although the latter may be substituted for inductor 9 while inductor 11 is deleted. The "split" inductors provide for circuit balance and symmetry although circuit will function equally as well with the conventional arrangement. After the source 1 is applied to the circuit the capacitor 10 charges through the diode matrix and input filter to the pulsating potential E, with the polarity indicated on the drawing.

As noted heretofore, controlled rectifiers 12 and 17 are fired at a fixed frequency (controlled by the frequency of oscillation of unijunction oscillator 198) many times greater than the frequency of the A.C. input source 1, and conduct for a portion of a half cycle (of oscillator 198) alternate to the half cycle during a portion of which controlled rectifiers 22 and 23 will be conductive. The conduction intervals of controlled rectifiers 12 and 17 and 22 and 23 may be prematurely terminated by controlled rectifiers 15 and 27, respectively. Thus, controlled rectifiers 12 and 17 may be "turned-off," for example, at 120 degrees within the 180 degree half cycle conduction interval of the total 360 degree full cycle of operation to compensate for a rise in load voltage. In the interval in time between 120 degrees and 180 degrees each of controlled rectifiers 12 and 17 and 22 and 23 will be nonconductive. Controlled rectifiers 22 and 23 will then be fired at the 180 degree start of the subsequent half cycle and will conduct until the 300 degree point in this half cycle in symmetrical fashion although, as is obvious from the control circuitry of FIG. 2, other than symmetrical operation could be easily achieved merely by changing the parameters of the control circuitry. In the given example each of controlled rectifiers 12 and 17 and 22 and 23 will be nonconductive in the time intervals between 120 and 180 and 300 and 360 degrees in time.

When controlled rectifiers 12 and 17 are conducting, a small amount of the energy stored in capacitor 10 is transmitted through the anode-cathode path of controlled rectifiers 12 and 17 to the series control circuit comprising diode 13, inductor 14, and capacitor 16. The parameters of inductor 14 and capacitor 16 are chosen so as to operate in the well-known "ringing" manner, i.e., as the charging current to capacitor 16 starts to exponentially decrease, the charging voltage exponentially increases, while the opposite effect, also on an exponential basis, is occurring in the inductor 14. The inherent effect of the inductor 14 is to attempt to sustain the charging current flow through capacitor 16 which, as a result, charges to a potential twice the input potential. Since the input potential in this case was the potential appearing across capacitor 10 and was represented by E, the potential appearing across capacitor 16 is thus 2E with the polarity shown on FIG. 1 of the drawing. In addition to the "ringing" arrangement, the parameters of inductor 14 and capacitor 16 are also chosen so as to charge capacitor 16 to the potential 2E rather quickly (in time) with respect to high frequency of operation. Because of the relatively high frequency at which the controlled rectifiers are switched, these components need only be relatively small, conventional "sized" capacitors and inductors, which thus eliminates the extremely large low frequency energy storage components required by the prior art. When controlled rectifiers 12 and 17 are conductive, the great majority of the energy is transferred both from capacitor 10 and the output of the diode matrix comprising diodes 2 through 7 to the energy storage network comprising inductors 19 and 21, capacitor 20, and fly-back diode 18. Inductors 19 and 21 again are "split" for circuit balance and symmetry. Fly-back diode 18 provides a rapid discharge path for the energy stored in the network comprising inductors 19 and 21 and capacitor 20 in keeping with the over-all high efficiency, high speed, operation of the present invention. Diode 13 is a blocking device which prevents energy dissipation in the inductor 14-capacitor 15 network when controlled rectifier 15 is not conducting. As noted it should be obvious that the great majority of the energy transmitted from the source 1 and capacitor 10 by the controlled rectifiers 12 and 17 is stored in the energy storage network which comprises inductors 19 and 21 and capacitor 20 and only a small fraction thereof is absorbed by the control and regulating circuit energy storage elements (inductor 14 and capacitor 16).

The conduction through controlled rectifiers 12 and 17 is terminated by the firing of controlled rectifier 15. As discussed, the point in time at which controlled rectifier 15 is fired is dependent upon load voltage variations. When the controlled rectifier 15 is fired, the positive potential 2E appearing across capacitor 16 is applied to the cathode of controlled rectifier 12. Since the potential appearing at the anode of controlled rectifier 12 is only E (i.e., the potential appearing across capacitor 10), the controlled rectifier is now "backbiased" which terminates conduction therethrough. Once controlled rectifier 12 ceases to conduct, there is no longer any forward current flow through controlled rectifier 17 and this controlled rectifier also ceases to conduct. Controlled rectifiers 12 and 17 remain in the nonconducting position until again "triggered" into conduction by a firing pulse. Controlled rectifier 15 continues to conduct until capacitor 16 is fully discharged at which time there is no longer any forward current flow through controlled rectifier 15 which thereby terminates the conduction therethrough. It should be noted that capacitor 16 discharges relatively quickly because of the low resistance discharge path thereby keeping in accord with the over-all inventive objective of high speed switching and small energy storage components.

As discussed, controlled rectifiers 22 and 23 are fired by pulses derived from the control circuit of FIG. 2, at the 180-degree point in the cycle of operation, the frequency being fixed by the frequency of the unijunction oscillator 198. In the manner described in connection with capacitor 10 and controlled rectifiers 12 and 17, the greater portion of the energy stored in capacitor 20 and inductors 19 and 21 is transmitted to energy storage filter inductor 29, capacitor 30 and the load 31 through controlled rectifiers 22 and 23. Diode 28 is a fly-back diode similar to diode 18. Capacitor 26, inductor 25 and diode 24 in combination with controlled rectifier 27 perform the "turn-off" and regulating functions in the same manner as capacitor 16, inductor 14, diode 13, and control rectifier 15, respectively, as discussed heretofore.

It should again be noted at this point that when controlled rectifiers 12 and 17 are conducting, controlled rectifiers 22 and 23 are not and vice versa thereby isolating the load from the source and the source from the load at every instant in the cycle of operation. The circuit interrupting or switching elements are switched at a frequency many times in excess of the input frequency which thereby eliminates the need for the large over-sized filter components of the prior art. In addition to the functions discussed, the successive energy storage stages perform the additional function of providing a filter action which thereby both eliminates input frequency ripple and reduces any ripple due to the switching frequency. The all but resistance-free parameters provide for rapid charge and discharge of all elements which in combination with the high frequency of operation results in high efficiency and small physically "sized" filter components, the only limitations on efficiency and size being the inherent properties of the parameters. The circuit balance provides for unity power factor operation. Although it may seem at first impression that the main and control circuitry would both be expensive and require large amounts of space, the present invention represents a considerable cost and space saving, further emphasizing the size and cost of the isolation transformer and associated regulating systems employed heretofore.

It should be clear that the circuit of FIG. 1 will also function if only two controlled rectifiers are employed, i.e., the controlled rectifiers 17 and 23 are eliminated. The preferred embodiment of FIG. 1 employs four controlled rectifiers to insure isolation and prevent any sneak discharge paths due to the relative phases of the input supply. It should be equally clear that only one energy storage network is required, i.e., the output network comprising inductor 29, capacitor 30, and fly-back diode 28 could be eliminated with only the network comprising inductors 19 and 21, capacitor 20 and fly-back diode 18 retained. The output of the second "chopper" which comprises controlled rectifiers 22 and 23 would then be fed directly to the load. The disadvantage here, however, is that the ripple and noise associated with the switching frequency would appear across the load. For these reasons, then, the preferred embodiment of FIG. 1 of applicant's invention employs output energy storage and filtering.

Since changes may be made in the above-described arrangements and different embodiments may be devised by those skilled in the art without departing from the spirit and scope of the invention, it is to be understood that all matter contained in the foregoing description and accompanying drawings is illustrative of the application of the principles of the invention and is not to be construed in a limiting sense.

What is claimed is:

1. In a transformerless rectifying regulating system, a source of direct current, first, second, third, fourth, fifth, and sixth controlled rectifiers each having anode, cathode and gate electrodes, first, second, third, fourth, and fifth energy storage means, a source of direct current, a load, means for connecting said first energy storage means across said source of direct current, means for serially connecting said source of direct current, the anode-cathode electrodes of said first controlled rectifier, the anode-cathode electrodes of said second controlled rectifier, said load, the anode-cathode electrode of said third controlled rectifier and the anode-cathode electrodes of said fourth controlled rectifier, means for connecting said second energy storage means from the cathode electrode of said first controlled rectifier to the anode electrode of said fourth controlled rectifier, means for serially connecting the anode-cathode electrodes of said fifth controlled rectifier from said second energy storage means to the cathode electrode of said first controlled rectifier, means for connecting said fourth energy storage means across said load, means for connecting said fifth energy storage means across said load, means for connecting the anode-cathode electrodes of said sixth controlled rectifier from said fourth energy storage means to the cathode electrode of said second controlled rectifier, gating means connected to the gate electrodes of each of said first, second, third, and fourth controlled rectifiers to initiate the conductive condition of said controlled rectifiers at fixed equal intervals, said first and fourth controlled rectifiers being conductive at intervals alternate to the intervals that said second and third controlled rectifiers are conductive, means responsive to load voltage variations connected to the gate electrodes of said fifth and sixth controlled rectifiers to control the conductivity of said fifth and sixth controlled rectifiers in accordance with load voltage variations whereby the conductivity of said fifth and sixth controlled rectifiers extinguishes the conductivity of said first and fourth and said second and third controlled rectifiers respectively to obtain voltage regulation.

2. A transformerless rectifier regulator system in accordance with claim 1 wherein said third and fifth energy storage means have individual asymmetrically conducting devices connected thereacross to provide for rapid energy dissipation and said second and fourth energy storage means have individual blocking asymmetrically conducting devices serially connected therewith to prevent energy dissipation when said fifth and sixth controlled rectifiers are nonconductive.

3. A transformerless rectifier regulating system having first and second terminals, first, second, third, fourth, fifth, and sixth controlled rectifiers, each having anode, cathode, and gate electrodes, first, second, third, fourth, fifth, sixth, seventh, eighth, ninth, tenth, eleventh, and twelfth energy storage means, first, second, third, fourth, fifth, sixth, seventh, eighth, ninth, and tenth asymmetrically conducting devices, a source of alternating current having first, second, and third phases, a load, means for serially connecting said first and second asymmetrically conducting devices between said first and second input terminals, means for serially connecting said third and fourth asymmetrically conducting devices between said first and second input terminals, means for serially connecting said fifth and sixth asymmetrically conducting devices between said first and second input terminals, means for connecting said first phase of said source of alternating current to said first and second asymmetrically conducting devices, means for connecting said second phase of said source of alternating current to said third and fourth asymmetrically conducting devices, means for connecting said third phase of said source of alternating current to said fifth and sixth asymmetrically conducting devices, means for serially connecting said first input terminal, said first energy storage means, said second energy storage means, said third energy storage means, and said second input terminal, means for serially connecting said first input terminal, said first energy storage means, the anode-cathode electrodes of said first controlled rectifier, said fourth energy storage means, the anode-cathode electrodes of said second controlled rectifier, said fifth energy storage means, said load, the anode-cathode electrodes of said third controlled rectifier, said sixth energy storage means, the anode-cathode electrodes of said fourth controlled rectifier, said third storage means and said second input terminal, means for serially connecting the cathode electrode of said first controlled rectifier, said seventh asymmetrically conducting device, said seventh energy storage means, said eighth energy storage means, and the anode electrode of said fourth controlled rectifier, means for connecting the anode electrode of said fifth controlled rectifier to said seventh and eighth energy storage means, means for connecting the cathode electrode of said fifth controlled rectifier to the cathode electrode of said first controlled rectifier, means for connecting said eighth asymmetrically conducting device between the anode electrode of said fourth controlled rectifier and the cathode electrode of said first controlled rectifier, means for connecting said ninth energy storage means between the cathode electrode of said third controlled rectifier and the anode electrode of said second controlled rectifier, means for serially connecting the cathode electrode of said second controlled rectifier, said ninth asymmetrically conducting device, said tenth energy storage means, said eleventh energy storage means and the anode electrode of said third controlled rectifier, means for connecting the anode electrode of said sixth controlled rectifier to said tenth and eleventh energy storage means, means for connecting the cathode electrode of said sixth controlled rectifier to the cathode electrode of said second controlled rectifier, means for connecting said tenth asymmetrically conducting device between the anode electrode of said third controlled rectifier and the cathode electrode of said second controlled rectifier, means for connecting said twelfth energy storage means across said load, gating means connected to the gate electrodes of each of said first, second, third, and fourth controlled rectifiers to initiate the conductive condition of said controlled rectifiers at fixed equal intervals, said first and fourth controlled rectifiers being conductive at intervals alternate to the intervals that said second and third controlled rectifiers are conductive, means responsive to load voltage variations connected to the gate electrodes of said fifth and sixth controlled rectifiers to control the conductivity of said fifth and sixth controlled rectifiers to extinguish the conductivity of said first and fourth and second and third controlled rectifiers, respectively, to obtain voltage regulation.

4. A transformerless rectifier regulating system in accordance with claim 3 wherein said first, third, fourth, fifth, sixth, seventh, and tenth energy storage means are inductors and said second, eighth, ninth, eleventh, and twelfth energy storage means are capacitors.

References Cited by the Examiner

UNITED STATES PATENTS

| | | | |
|---|---|---|---|
| 2,810,105 | 10/1957 | Henrick | 323—22 |
| 3,015,739 | 1/1962 | Manteuffel | 307—88.5 |
| 3,040,239 | 1/1962 | Walker | 323—24 |
| 3,147,419 | 9/1964 | Cope | 318—129 |
| 3,192,468 | 6/1965 | Buchanan | 323—22 |

JOHN F. COUCH, *Primary Examiner.*

LLOYD McCOLLUM, *Examiner.*

K. D. MOORE, *Assistant Examiner.*